No. 814,326. PATENTED MAR. 6, 1906.
A. W. PERRY.
DRILL CUP.
APPLICATION FILED APR. 11, 1905.

WITNESSES.
C. F. Snow
C. G. Hansen

INVENTOR.
Albert W. Perry
By Paul & Paul
HIS ATTORNEYS.

UNITED STATES PATENT OFFICE.

ALBERT W. PERRY, OF NORTHVILLE, SOUTH DAKOTA.

DRILL-CUP.

No. 814,326.  Specification of Letters Patent.  Patented March 6, 1906.

Application filed April 11, 1905. Serial No. 255,038.

*To all whom it may concern:*

Be it known that I, ALBERT W. PERRY, of Northville, Spink county, South Dakota, have invented certain new and useful Improvements in Drill-Cups, of which the following is a specification.

My invention relates to improvements in grain-drills, and particularly in the wheels for feeding the grain from the feed-cups as the machine moves over the field.

The object of the invention is to provide a wheel that will not clog and stop the feed should a nail, pebble, or other foreign material pass down into the cup with the grain.

A further object is to provide a wheel that is easily accessible for the purpose of examination or to remove any foreign material that may have lodged in the cup surrounding the same.

A further object is to provide a wheel that will have a positive and uniform feed and one that will operate effectively under all conditions and will feed any kind of grain.

The invention consists generally in a feed-cup and a feed-wheel operating therein and dished or hollowed out on one side and provided with a series of shallow grooves that extend tangentially with respect to the axis of the wheel toward the periphery thereof.

Further, the invention consists in a removable feed-cup inclosing the wheel and from which the grain is lifted by the revolution of the wheel.

Further, the invention consists in various constructions and combinations, all as hereinafter described, and particularly pointed out in the claims.

Figure 3:
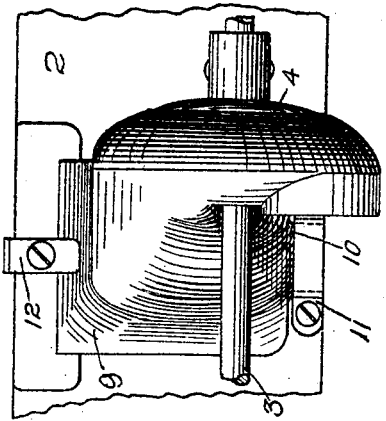
Figure 5:
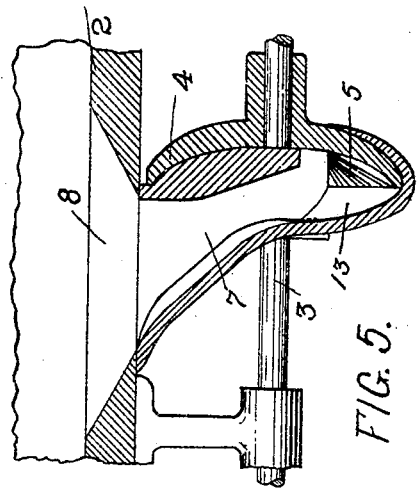
Figure 2:
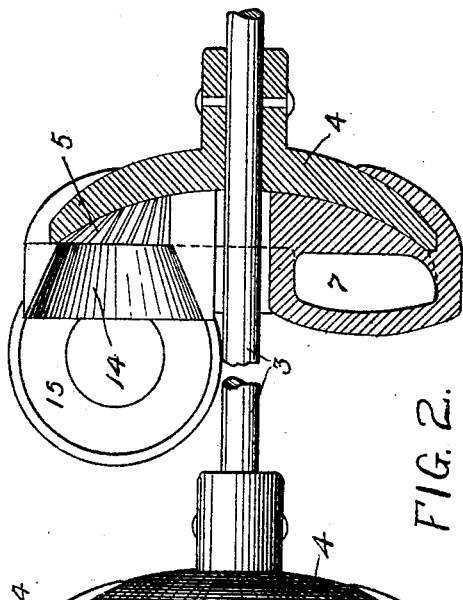
Figure 4:
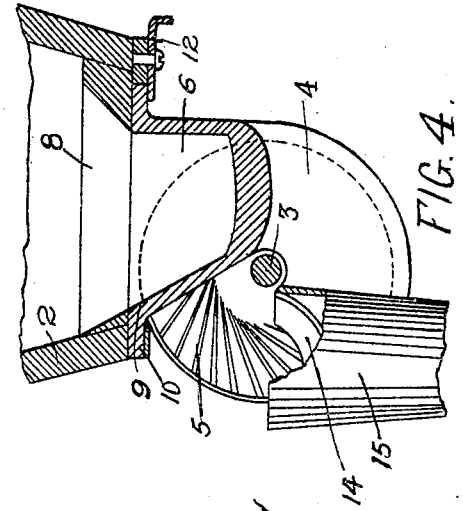
Figure 1:
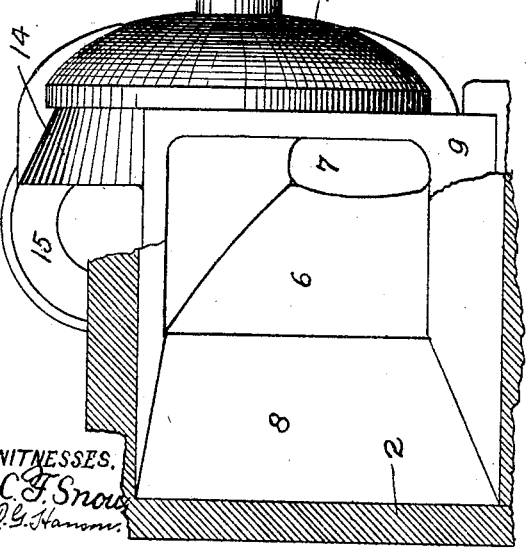
Figure 1:
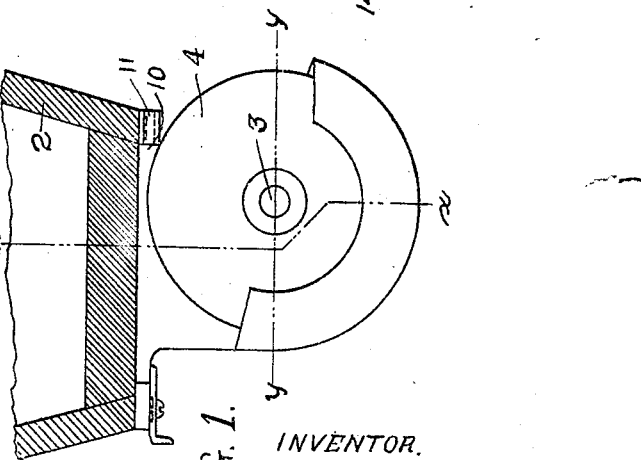

In the accompanying drawings, forming part of this specification, Figure 1 is a transverse sectional view through a drill-hopper, showing the position of the feed-cup and its wheel beneath. Fig. 2 is a sectional view on the line *y y* of Fig. 1. Fig. 3 is a detail view looking at one of the wheels and its cup and illustrating the manner of securing the cup to the bottom of the drill-hopper. Fig. 4 is a transverse sectional view through the drill-hopper and the feed-cup beneath, and Fig. 5 is a sectional view on the line *x x* of Fig. 1.

In the drawings, 2 represents a drill-hopper of the ordinary style mounted, as usual, upon a wheeled axle and wherein the grain to be sown is placed. The supports for the drill-hopper being of common construction are all omitted in the drawings, as they form no part of my present invention.

3 is a shaft extending across the machine beneath the drill-hopper and geared to the machine axle or wheels in any suitable manner, and upon this shaft I provide a series of feed-wheels 4, secured in any suitable way and in the form of dish-shaped disks arranged to revolve with said shaft in a vertical plane and each provided on its concave surface with a series of shallow grooves 5, that are tangentially arranged with respect to the axis of the disk and extend to the periphery thereof. I have only shown two of these disks on the shaft 3; but it will be understood that there are a series of them secured on said shaft at intervals, the number depending upon the width of the machine. A feed-cup 6 is provided having a spout 7, whose open end is adapted to fit snugly against the bottom of the hopper 2 around a discharge-opening 8 therein, the bottom of said drill-hopper being inclined toward said opening to facilitate the discharge or flow of the grain therein, as usual in machines of this kind. A flange 9 preferably surrounds the upper end of the spout 7 and is provided on one side with a lug 10, fitting into a socket 11, secured on the bottom 2. A button 12, mounted on the bottom of the drill-hopper, is arranged to swing around under the flange 9 on the side of the feed-cup opposite from the lug 10 and aid in holding the cup in place against the bottom of the drill-hopper, but allow its ready removal independently of all the other cups whenever desired. The operator is thus able to obtain access to each feed-wheel at any time while the machine is in use in the field without the use of special tools and without the necessity of removing or disturbing any of the other wheels or parts of the machine.

The spout 7 leads down into a pocket 13 at the lower end of the feed-cup, and within this pocket the feed-wheel 4 operates, the walls of the pocket conforming to the surface of the wheel on one side to allow space for the grain to flow into and contact with the roughened dish-shaped inner surface of the wheel. An opening is provided in the upper rear wall of the pocket 13, and a ledge 14 is provided at the edge of said opening near the roughened surface of the wheel and whereon the grain is discharged from the wheel and allowed to drop upon the ground. The grooves in the concave face of the feed-wheel are so arranged, as indicated in Fig. 4, that they will pick up the grain in the bottom of the pocket and elevate it toward the ledge 14, and when these grooves arrive at a point opposite said ledge their inclination will be such that the grain will roll out and fall upon the ledge and from thence to the ground.

The passage from the drill-hopper down to the bottom of the pocket, as shown clearly in Fig. 5, is direct and unobstructed, and any foreign material that falls into the pocket will be gathered up by the roughened surface of the feed-wheel and discharged out of the machine without any danger of clogging or breaking any of the parts or interrupting the operation of the machine. Grain and seeds of all kinds may be fed by this wheel with equal facility. Its feed is positive and uniform, and there are no delicate parts that are likely to become broken or damaged, and in case of accident to a wheel its examination is permitted, and at any time a feed-cup can be removed for inspection or to substitute another.

A tube 15 is arranged to fit around the edge of the ledge 14 and receive the grain therefrom, and the upper end of this tube extends above the ledge and acts as a wind-break to prevent the seeds from being blown away or scattered around the machine. The wheels are preferably made right and left and oppositely arranged on each side of the center, so that the driver sitting in the middle of the machine can look each way and watch the feed of the wheels and discover at once if the feed of any one of the wheels should be stopped through clogging of the grain in a feed-cup.

I claim as my invention—

1. The combination, with a drill-hopper having a discharge-opening, of a feed-cup supported beneath said opening and having a pocket in its lower end, a feed-wheel operating in said pocket and having a concave face provided with a series of tangential grooves and said cup having a grain-passage which allows the unobstructed descent of the grain from said hopper into said pocket and grooves.

2. The combination, with a drill-hopper having a discharge-opening, of a feed-cup detachably supported beneath said opening and having a pocket in its lower end and a grain-passage leading from said opening to said pocket, a concavo-convex feed-wheel arranged to revolve in said pocket and having its concave face provided with a series of tangential grooves, and said feed-cup being removable from said hopper without disturbing said feed-wheel, substantially as described.

3. The combination, with a drill-hopper having a discharge-opening, of a feed-cup supported beneath said opening and having a semicylindrical pocket at its lower end with a discharge-opening on one side, a concavo-convex feed-wheel having its concave face provided with a series of tangential grooves and arranged to revolve in a vertical plane in said pocket, and said cup having an unobstructed grain-passage leading from said hopper to the bottom of said pocket and into said grooves, substantially as described.

4. The combination, with a drill-hopper having a discharge-opening, of a feed-cup supported beneath said opening and provided with a pocket in its lower end, and a grain-passage leading thereto from said discharge-opening, said pocket having a grain-discharge opening on one side, a concavo-convex disk having its lower portion arranged to project through an opening in the wall of said pocket on the other side and revolve in said cup and pocket, the convex face of said disk contacting with one wall of said pocket and the concave face of said disk being spaced from the opposite wall of said pocket and provided with a series of tangential grooves, the space between said concave face and the pocket-wall forming the terminal of said grain-passage, substantially as described.

5. The combination, with a drill-hopper having discharge-openings, of a series of feed-cups supported beneath said openings and provided with pockets in their lower ends, the walls of said pockets on one side being recessed to form discharge-openings, a series of concavo-convex feed-wheels arranged to revolve in said pockets and recesses, the convex faces of said wheels contacting with the walls of said pockets on one side and the concave faces of said wheels being spaced from the opposite walls of said pockets and provided with a series of tangential grooves, and the spaces between said wheels and pocket-walls forming continuations of said grain-passages, substantially as described.

6. The combination, with a drill-hopper having a discharge-opening, of a feed-cup having a lug on one side to fit into a socket provided on the bottom of said hopper, a button provided on said hopper upon the opposite side of said cup and adapted to engage the same and support it beneath said opening, and a concavo-convex feed-wheel arranged to revolve in a pocket provided in the lower end of said cup, and said cup being removable from said hopper without disturbing said wheel.

7. The combination, with a drill-hopper having a series of discharge-openings, of a series of feed-cups supported beneath said openings and having pockets in their lower ends, the walls of said cups being recessed on one side to allow the discharge of grain from said pockets, a series of feed-wheels operating in said pockets and having concave faces provided with a series of tangentially-arranged grooves, and said cups and wheels being oppositely arranged on each side of the center of said hopper whereby all said discharge-openings will be visible from a point near the middle of the drill.

8. The combination with a drill-hopper having a discharge-opening, of a feed-cup supported beneath said opening and having a grain-passage, a concavo-convex feed-wheel arranged to revolve in said cup and having its concave face provided with a series of tangential grooves, and said feed-cup being removable from said hopper without disturbing said feed-wheel, substantially as described.

9. The combination with a drill-hopper having a discharge-opening, of a feed-cup supported beneath said opening and having a grain-passage, and a grain-discharge opening in one of its side walls, a concavo-convex disk having its lower portion arranged to project through an opening in the wall of said cup on the opposite side from said grain-discharge opening, the convex face of said disk contacting with one wall of said cup and the concave face of said disk being spaced from the opposite wall of said cup and provided with a series of tangential grooves, the space between said concave face and the cup-wall forming the terminal of said grain-passage, substantially as described.

10. The combination with a drill-hopper having a series of discharge-openings, of a series of feed-cups supported beneath said opening, the walls of said cups being recessed on one side to allow the discharge of grain therefrom, a series of feed-wheels operating in said cups and having concave faces provided with a series of tangentially-arranged grooves, and said cups and wheels being oppositely arranged on each side of the center of said hopper whereby all said discharge-openings will be visible from a point near the middle of the drill, substantially as described.

11. The combination, with a drill-hopper having a discharge-opening, of a feed-cup supported beneath said opening and having a grain-passage, a feed-wheel arranged to revolve in said cup, and said feed-cup being removable from said hopper without disturbing said feed-wheel, substantially as described.

12. The combination with a drill-hopper having a discharge-opening, of a feed-cup supported beneath said opening and having a grain-passage and a pocket substantially V-shaped in cross-section communicating therewith, said pocket having a discharge-opening in its side wall, and a feed-wheel operating in said pocket and having means for lifting the grain to said discharge-opening, substantially as described.

13. The combination with a drill-hopper having a discharge-opening, of a feed-cup supported beneath said opening and having a pocket provided with a discharge-opening in its side wall, a feed-wheel operating in said pocket and having a series of tangential grooves arranged to receive and lift the grain to said discharge-opening, substantially as described.

14. The combination with a drill-hopper having a discharge-opening, of a feed-cup supported beneath said opening and having a pocket provided with a discharge-opening in its side wall, and an unobstructed grain-passage leading from said hopper to said pocket, and a feed-wheel operating in said pocket and having means for engaging and lifting the grain to said discharge-opening.

In witness whereof I have hereunto set my hand this 24th day of March, 1905.

ALBERT W. PERRY.

Witnesses:
   RICHARD PAUL,
   C. G. HANSON.